Patented Mar. 9, 1937

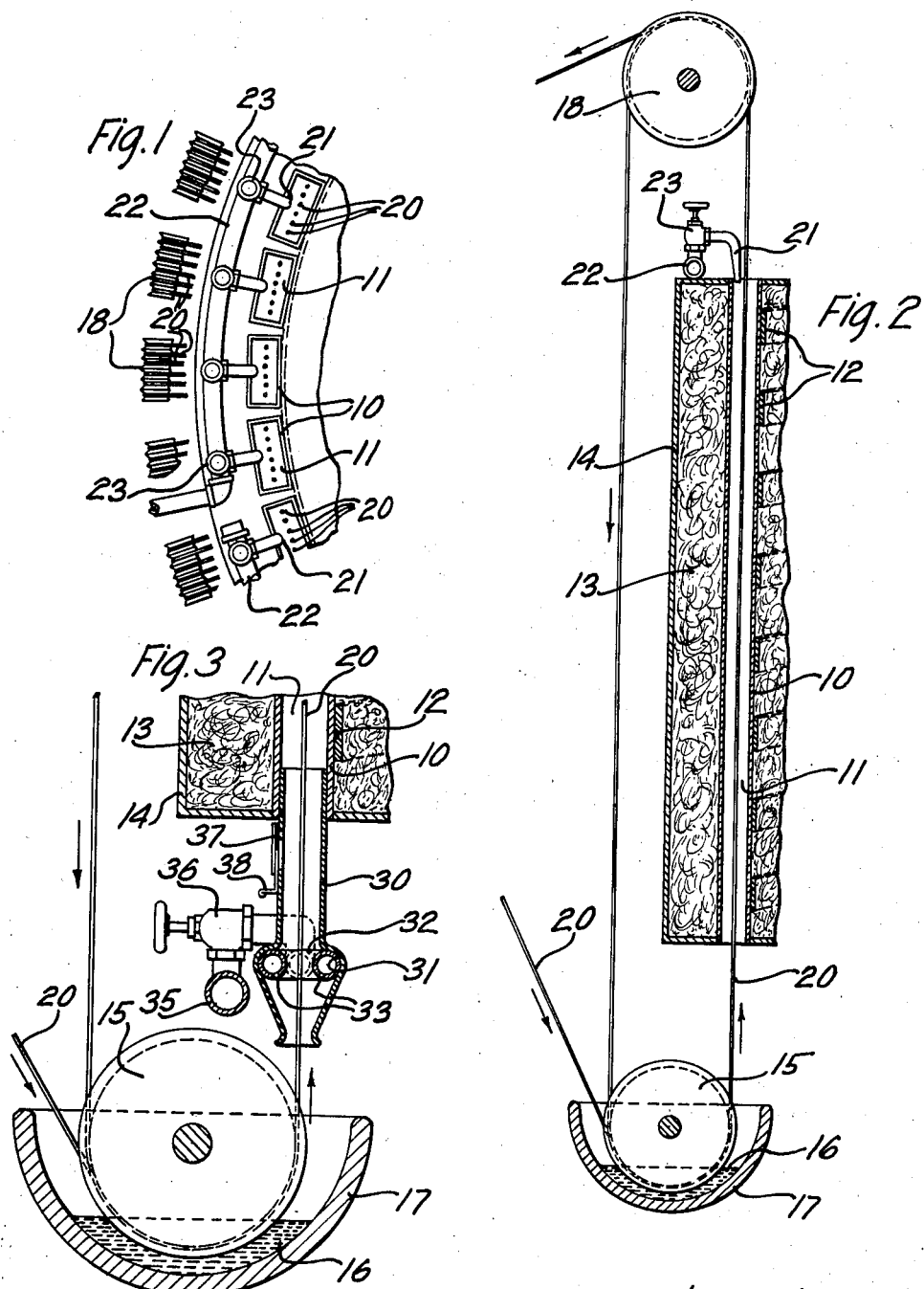

2,073,461

UNITED STATES PATENT OFFICE 2,073,461

APPARATUS FOR CONTROLLING THE FLOW OF GASEOUS MEDIA

Steven S. Cerwin, Cicero, Ill., assignor to Western Electric Company, Incorporated, New York, N. Y., a corporation of New York Application April 6, 1932, Serial No. 603,521

8 Claims. (Cl. 91—55)

This invention relates to apparatus for controlling the flow of gaseous media, and more particularly to apparatus for controlling the draft or circulating air in wire enameling ovens.

One well known type of machine for applying a baked enamel insulating coating on wires comprises a series of separate vertical tubes or ovens through which separate wires are simultaneously drawn after being passed through a bath of enamel, the enamel coatings thus applied being baked upon the wires as they pass through the individual ovens. In a machine of this type, it is essential, in order to produce a uniformly baked coating on all the wires, that uniform temperatures be maintained within all of the ovens. This has been difficult, heretofore, because of variations in the natural draft or upward flow of air within the individual ovens. Also, the cooling effect of the natural draft, when excessive, results in a costly dissipation of heat.

Objects of the present invention are to provide a simple, efficient and inexpensive apparatus for controlling the flow of gaseous media.

In accordance with the above objects, the invention contemplates controlling the flow of gaseous media by a controlled opposing current of air or other gaseous medium.

In one embodiment of the invention, the natural draft or upward flow of air in the individual baking chambers or ovens of a wire enameling machine is regulated or reduced to the desired degree by an opposing downwardly directed controlled jet or current of air or other gaseous medium introduced into the upper end of each of the ovens.

In another form of the invention, an inspirator nozzle is connected to the lower end of each of baking ovens and a controlled current of air or other gaseous medium is directed downwardly into the throat of the nozzle, thereby retarding the natural draft or upward flow of air through the ovens.

A more complete understanding of the invention may be had from the following detailed description, when read in conjunction with the accompanying drawing, in which Fig. 1 is a schematic fragmentary plan view, partly in section, of a multi-unit wire enameling machine embodying the invention;

Fig. 2 is a schematic fragmentary vertical section through one of the units, and Fig. 3 is a fragmentary section similar to Fig. 2, showing an alternative form of the invention.

Referring to the drawing, the numeral 10 designates a vertical tube or casing which is open at both ends. The interior of this tube constitutes a baking chamber 11 which is heated in any suitable manner, as by means of electrical heating elements 12 connected to a source of electric current supply (not shown). The tube 10 is surrounded by a suitable heat insulating material 13 enclosed within a casing 14. Rotatably mounted below the tube 10 is a sheave 15 which is partially immersed in a bath 16 of a coating compound, such as an insulating enamel, contained within a trough 17. A second sheave 18 is rotatably mounted above the tube 10.

A wire 20 drawn from a supply spool (not shown) is passed around the lower sheave 15 through the enamel bath 16 and thence upwardly through the baking chamber 11 and around the upper sheave 18. Each of the sheaves 15 and 18 is provided with a number of grooves, so that the wire may be passed through the enamel bath and the baking chamber as many times as may be desired. After making its last pass through the baking chamber, the coated wire is guided to a take-up reel (not shown) which may be power driven to draw the wire through the baking chamber at any desired speed.

The tube 10 together with the sheaves 15 and 18 and the usual supply and take-up reels may constitute one unit of a multi-unit wire enameling machine in which the individual units may be grouped together in either straight line, circular or in any other formation. Since machines of this general type are well known in the art, it is believed that the foregoing brief description thereof taken with the accompanying drawing will be sufficient to a complete understanding of the instant application of the present invention.

In the embodiment of the invention shown in Figs. 1 and 2, an air nozzle 21 is positioned adjacent the wire exit opening at the upper end of the baking oven so as to project a jet or current of air or other gaseous medium downwardly within the baking chamber 11. This downwardly projected current of air opposes and thereby retards the natural draft or upward flow of air through the baking chamber, thus decreasing the amount of heated air emerging from the upper open end of the chamber and correspondingly decreasing the amount of cool air entering the bottom of the chamber with the result that a substantially lesser amount of electrical energy is required to maintain a predetermined baking temperature within the chamber. A further saving of heat may be obtained by employing an opposing current of steam, heated air or other gaseous medium to retard the natural draft or upward flow of air through the baking chamber.

The air nozzle 21 is connected to a compressed air line 22 through a control valve 23, whereby the downwardly projected current of air may be regulated to reduce the natural draft within the baking chamber to any desired degree. In practice, it has been found that the maximum efficiency is obtained when the upward flow of air through the baking chamber is reduced to an amount just sufficient to insure the oxidation of the enamel and the carrying off of the evaporated solvent into the exhaust. If desired, however, the downwardly projected current of air may be regulated to produce a substantially stagnant condition within the baking chamber. Also, by increasing the pressure of the downwardly projected current of air, the direction of the draft or air flow within the baking chamber may be reversed.

When a plurality of wire enameling units are grouped together, as shown in Fig. 1, a separate air nozzle 21 and control valve 23 are provided for each unit. Thus, although all of the air nozzles may be connected to the same compressed air line 22, the currents of air from the nozzles may be individually regulated so as to secure a predetermined uniform upward flow of air within all of the baking chambers, whereby a uniform baking temperature therein is readily maintained.

In the embodiment of the invention shown in Fig. 3, the upward flow of air through the baking chamber 11 is retarded to the desired degree by a form of inspirator nozzle at the lower end of the chamber. A tubular extension 30 on the lower end of the tube 10 is formed with an enlarged chamber 31 within which an air manifold 32 having a series of apertures 33 is arranged to direct a plurality of jets of air diagonally downwardly against the wire, thereby retarding the upward flow of air through the baking chamber. Also, the downwardly projected jets of air may serve to remove surplus coating material from the wire before it enters the baking chamber.

The air manifold 32 may be connected to a compressed air line 35 through a control valve 36, whereby the downwardly projected current of air may be regulated. Also, the tubular extension 30 may be provided with an opening 37 above the air manifold and the amount of outside air entering through this opening may be controlled by a shutter 38 to thereby further regulate the retarding and wiping effects of the downwardly projected jets of air.

It is to be understood that the invention is not limited to the specific embodiments thereof herein illustrated and described, but is capable of other applications within the scope of the appended claims.

What is claimed is:

1. In an apparatus for coating wires, including means for applying a coating material to a wire and a heated vertical chamber open at the top and bottom and through which the heated air normally flows upwardly for treating the coating material upon the wire as it is passed upwardly therethrough, means near the bottom of the chamber for projecting a jet of air diagonally downwardly against the wire as it enters the chamber to remove surplus coating material from the wire and retard the upward flow of air through the chamber.

2. In a wire coating apparatus, a vertical heating chamber open at the top and bottom through which the heated air normally flows upwardly means at one end of the chamber for projecting a jet of a gaseous medium under pressure downwardly along a wire passing through the chamber to retard the upward flow of the heated air, and adjustable valve means for varying the jet to adjust the retardation of the air.

3. In a wire coating apparatus, a vertical heating chamber open at the top and bottom through which the heated air normally flows upwardly, and adjustable means at one end of the chamber for projecting a variable jet of a gaseous medium under pressure along a wire passing through the chamber to adjustably regulate the upward flow of the heated air.

4. In a wire coating apparatus, a vertical heating chamber open at the top and bottom through which the heated air normally flows upwardly, a compressed air line, and a nozzle connected thereto and extending into the upper part of said chamber for projecting a jet of air downwardly through the chamber to retard the upward flow of the heated air.

5. In a wire coating apparatus, an open vertical heating chamber open at the top and bottom through which the heated air normally flows upwardly, means at one end of the chamber for projecting a jet of a gaseous medium under pressure downwardly along a wire passing through the chamber to retard the upward flow of the heated air, and means to vary the jet to adjust the retardation of the air.

6. In a wire coating apparatus, an open vertical heating chamber open at the top and bottom through which the heated air normally flows upwardly, means at the lower end of the chamber for projecting a jet of a gaseous medium under pressure downwardly along a wire passing through the chamber to retard the upward flow of the heated air, and means to vary the jet to adjust the retardation of the air.

7. In a wire coating apparatus, a plurality of separate vertical heating chambers open and substantially unobstructed at the top and bottom through which the heated air normally flows upwardly, a separate air nozzle at one end of each chamber for projecting a jet of air along a wire passing through the chamber and in a direction to retard the upward flow of the heated air, a common compressed air supply line for all the nozzles, and a separate control valve for each nozzle for varying the air jets to separately adjust the retardation of the air in the respective chambers.

8. In a wire coating apparatus, an open vertical heating chamber open at the top and bottom through which the heated air normally flows upwardly, means near the upper end of the chamber for projecting a jet of a gaseous medium under pressure downwardly along a wire passing through the chamber to retard the upward flow of the heated air, and means to vary the jet to adjust the retardation of the air.

STEVEN S. CERWIN.